United States Patent
Hsu et al.

(10) Patent No.: US 9,057,939 B2
(45) Date of Patent: Jun. 16, 2015

(54) LIGHT SOURCE STRUCTURE OF PROJECTOR

(75) Inventors: Chien-Wen Hsu, New Taipei (TW); Wen-Pin Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 170 days.

(21) Appl. No.: 13/615,725

(22) Filed: Sep. 14, 2012

(65) Prior Publication Data

US 2013/0271734 A1 Oct. 17, 2013

(30) Foreign Application Priority Data

Apr. 11, 2012 (TW) .............................. 101112712 A

(51) Int. Cl.
G03B 21/28 (2006.01)
G03B 21/20 (2006.01)
G03B 21/14 (2006.01)

(52) U.S. Cl.
CPC ............ *G03B 21/2013* (2013.01); *G03B 21/14* (2013.01); *G03B 21/208* (2013.01)

(58) Field of Classification Search
CPC . H04N 9/3152; H04N 9/3197; G02B 27/145; G02B 27/149; G03B 21/14
USPC ............... 353/30, 31, 37, 38, 85, 97, 99, 102; 348/222.1, 743–747, E05.024; 359/462, 467, 475, 477, 478, 614, 619, 359/629, 896; 372/38.02, 31; 349/5, 7–9
See application file for complete search history.

(56) References Cited

U.S. PATENT DOCUMENTS

| | | | |
|---|---|---|---|
| 6,042,249 A * | 3/2000 | Spangenberg | 362/259 |
| 7,967,445 B2 * | 6/2011 | Hamano et al. | 353/31 |
| 2002/0140905 A1 * | 10/2002 | Ouchi et al. | 353/31 |
| 2006/0132725 A1 * | 6/2006 | Terada et al. | 353/102 |
| 2010/0171931 A1 * | 7/2010 | Kessler et al. | 353/31 |
| 2011/0051251 A1 * | 3/2011 | Endoh et al. | 359/614 |
| 2011/0211168 A1 | 9/2011 | Kim et al. | |
| 2012/0026469 A1 | 2/2012 | Akiyama | |
| 2012/0188516 A1 * | 7/2012 | Kashiwagi et al. | 353/31 |
| 2012/0194787 A1 * | 8/2012 | Sawai | 353/31 |
| 2013/0135593 A1 * | 5/2013 | Saitou | 353/31 |

FOREIGN PATENT DOCUMENTS

CN 102346366 A 2/2012

* cited by examiner

*Primary Examiner* — Sultan Chowdhury
(74) *Attorney, Agent, or Firm* — Novak Druce Connolly Bove + Quigg LLP

(57) ABSTRACT

A light source structure of a projector includes at least a solid state lighting element, at least an optical collimator lens, a condenser lens, and a light dispersing apparatus. The solid state lighting element generates a plurality of radial beams, which are incident, to the optical collimator lens. The optical collimator lens converts the radial beams into a plurality of parallel beams which strike the condenser lens. The parallel beams are concentrated and focused by the condenser lens into a projecting beam. The light dispersing apparatus is positioned on at a focal point of the condenser lens and receives the projecting beam to scatter the projecting beam uniformly.

15 Claims, 2 Drawing Sheets

LIGHT SOURCE STRUCTURE OF PROJECTOR

BACKGROUND

1. Technical Field

The disclosure relates to Sight source structures of projectors, and particularly to a light source structure having solid state light elements and parallel beams for transmission.

2. Description of Related Art

Critical requirements for light sources for projectors are high brightness level and high luminance. Light sources for projectors include non-solid state lighting sources or solid state lighting sources. Current non-solid state lighting sources include tungsten-halogen lamps, metal-halogen lamps, high-pressure mercury-vapor lamps, and xenon lamps. Non-solid state lighting sources have high brightness level, and include elliptical reflectors or parabolic reflectors to reflect the radial beams into parallel beams for further projection. However, these non-solid state lighting sources have defects of excessive heat generation, bulkiness, and high energy consumption. Further, they contain toxic substances, such as mercury that is unrecyclable.

Many projectors use solid state light devices, including light-emitting diodes, or laser diodes, to replace conventional non-solid state lighting sources. Solid state lighting sources have high color saturation; however, they lack such elliptical reflectors or parabolic reflectors to enhance luminance. Therefore, it is desirable to have light source structures of high brightness, high luminance, and use non-toxic materials for projectors.

BRIEF DESCRIPTION OF THE DRAWINGS

The components in the drawings are not necessarily drawn to scale, the emphasis instead being placed upon clearly illustrating the principles of a light source structure of a projector. Moreover, in the drawings, like reference numerals designate corresponding parts throughout the several views.

DETAILED DESCRIPTION

Embodiments of the disclosure will be described with reference to the accompanying diagrams.

Figure 1:
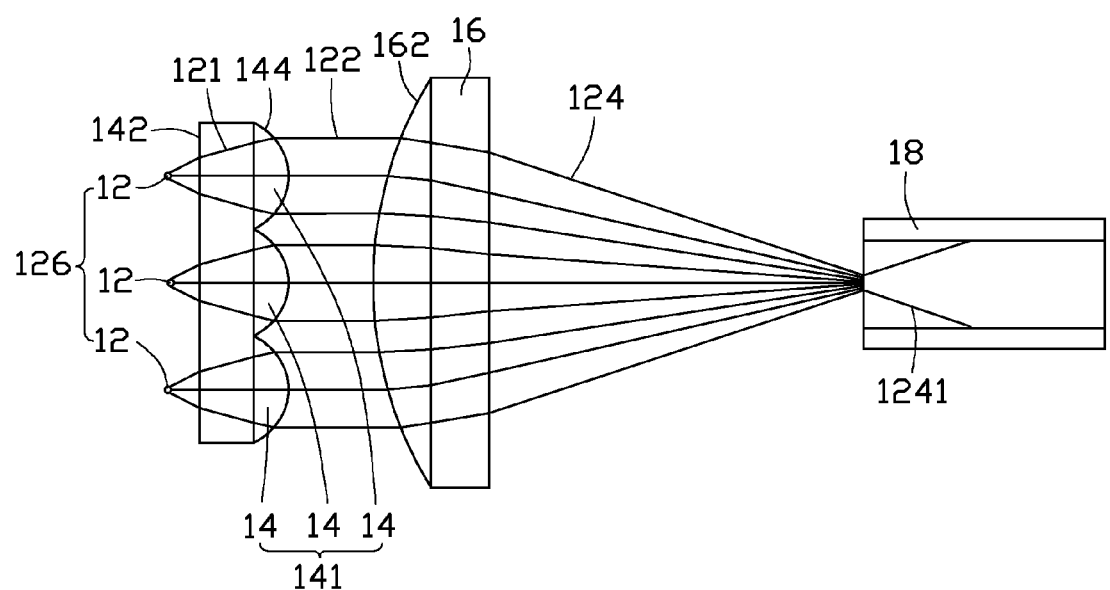
FIG. 1 is a cross-sectional diagram illustrating a light source structure of a projector of the disclosure.

FIG. 1 shows a cross-sectional diagram of a light source structure 10 of a projector. The light source structure 10 includes at least one solid state light element 12, at least one optical collimator lens 14, a condenser lens 16, and a light dispersing apparatus 18. Each solid state light element 12 is aligned with one corresponding optical collimator lens 14. In other words, the optical collimator lens 14 is positioned in front of the solid state lighting element 12, and the condenser lens 16 is positioned in front of the optical collimator lens 14. Each solid state light element 12 generates a plurality of radial beams 121, which strike the corresponding optical collimator lens 14. The optical collimator lens 14 converts the radial beams 121 into a plurality of parallel beams 122 that strike the condenser lens 16. The condenser lens 16 focuses the parallel beams 122 into a plurality of projecting beams 124. The projecting beams 124 are transmitted to the light dispersing apparatus 18. The light dispersing apparatus 18 uniformly scatters the projecting beams 124 into a plurality of dispersed projecting beams 1241 can then be projected onto a projection surface (not shown) to form images.

The light source structure 10 of the present embodiment uses the light dispersing apparatus IS to scatter the projecting beams 124 uniformly. Image projection after the projecting beams 124 are scattered uniformly are not the feature of the disclosure and therefore is not discussed in detail.

The solid state light elements 12 may be light emitting diodes or a laser light elements to generate the radial beams. The number of the solid state light elements 12 may be modified depending on requirements of brightness and luminance.

Figure 2:
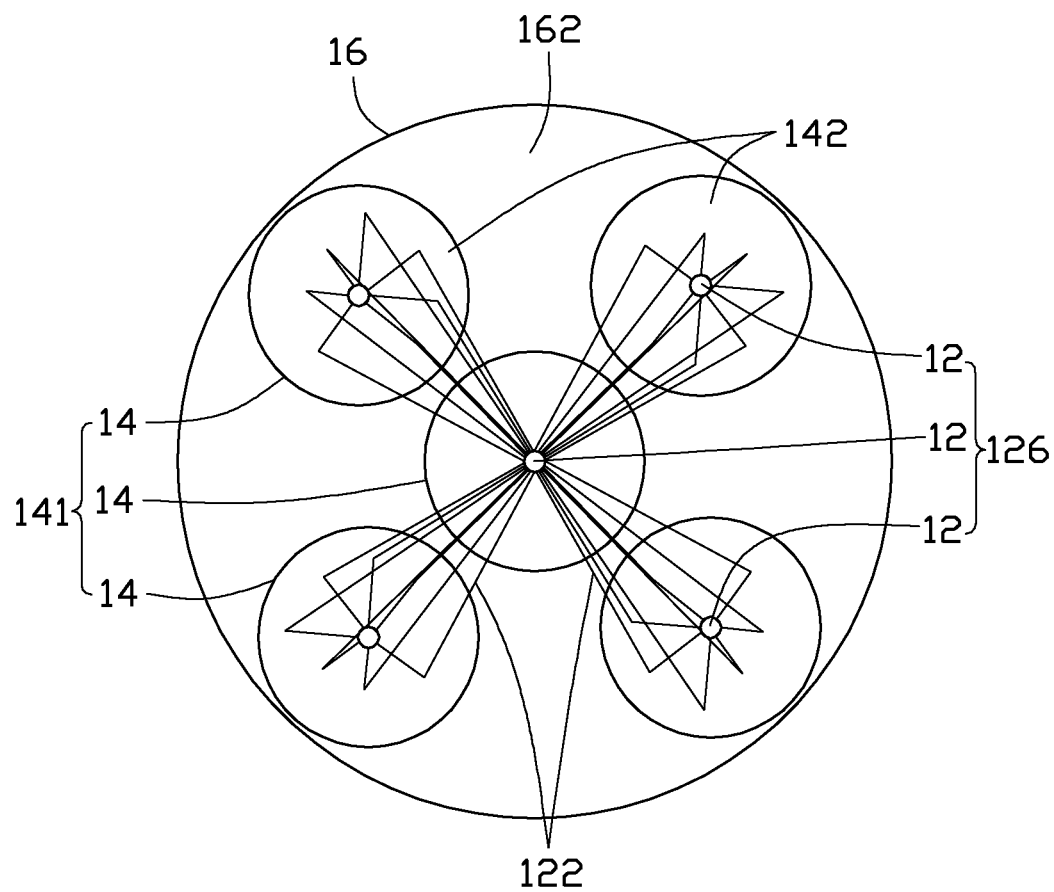
FIG. 2 is a rear view diagram illustrating the light source structure of FIG 1.

In the present embodiment, the light source structure 10 has five solid state light elements 12 arranged as a solid state lighting array 126 as an X (see FIG. 2). The solid state light elements 12 are electrically connected and simultaneously generate radial beams 122 of required brightness and color saturation.

Similarly, the optical collimator lenses 14 of the present embodiment are arranged as an optical collimator lens array 141 corresponding to the solid state lighting array 126, The optical collimator lens array 141 is arranged corresponding to the arrangement of the solid state lighting array 126. The condenser lens 16 is placed in front of the optical collimator lens array 141. The light dispersing apparatus 18 is placed at a focal point of the condenser lens 16 to scatter the projecting beam 124. in the present embodiment, the Sight dispersing apparatus 18 is a light tunnel.

Light pathway of the light source structure 10 begins at the solid state light element 12. The radial beams 121 strike the optical collimator lens array 141 on the first incident surface 142 facing the solid state light element 12, pass through the optical collimator lens array 141, and then exit from a first exiting surface 144 opposite to the first incident surface 142. The radial beams 121 are converted into parallel beams 122 and project to a second incident surface 162 of the condenser lens 16. The light condenser lens 16 concentrates and focuses the parallel beams 122 into a plurality of projecting beams 124, which are further scattered by the light dispersing apparatus 18 for projecting onto a projection surface.

The light source structure 10 of the disclosure uses the optical collimator lenses 14 to convert the radial beams 121 into the parallel beams 122 for transmission. The light source structure 10 uses solid state light devices 12, which do not contain harmful substances such as mercury. Compared to projectors in related art, which use bulky elliptical reflectors or parabolic reflectors to form parallel beams, the light source structure 10 uses an optical collimator lens 14, which is less bulky and aides in further miniaturization of projectors. Assembly of solid state light devices 12 as the main component of the light source structure 10 not only provides light sources of high brightness, high luminance, and good color saturation, but also is preferable from the viewpoint of environmental protection and manufacturing costs.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A light source structure of a projector, the light source structure comprising: a solid state lighting element generating a plurality of radial beams; an optical collimator lens positioned on a light path of the radial beams; a condenser lens aligned with the solid state lighting element and the optical collimator lens; and a light dispersing apparatus positioned on a focal point of the condenser lens; wherein the radial beams strike the optical collimator lens where the radial beams are converted into a plurality of parallel beams and transmitted to the condenser lens; and wherein the plurality of parallel beams are gathered by the condenser lens into a plurality of projecting beams which enter the light dispersing apparatus; wherein the solid state lighting array comprises five of the solid state lighting elements, the five solid state lighting elements are arranged in a cross shape, one of the solid state lighting elements is located in a center of the cross shape, and the other four solid state lighting elements surround the solid state lighting element located in the center of the cross shape.

2. The light source structure of claim 1, wherein the optical collimator lens is positioned in front of and aligned with the solid state lighting element, and the optical collimator lens comprises a first incident surface facing the solid state lighting element and a first exiting surface opposite to the first incident surface.

3. The light source structure of claim 2, wherein the condenser lens is positioned in front of and aligned with the optical collimator lens, and the condenser lens comprises a second incident surface facing the first exiting surface of the optical collimator lens.

4. The light source structure of claim 3, wherein the solid state light element comprises light emitting diode.

5. The light source structure of claim 4, wherein the solid state light element comprises laser diode.

6. A light source structure of a projector, the light source structure comprising: a solid state lighting array comprising a plurality of solid state lighting elements to generate a plurality of radial beams; an optical collimator lens array comprising a plurality of optical collimator lenses positioned on a light path of the radial beams; a condenser lens positioned on a side of the optical collimator lens array opposite to the solid state lighting array; and a light dispersing apparatus positioned on a focal point of the condenser lens; wherein the radial beams strike to the optical collimator lens array where the radial beams are converted into a plurality of parallel beams, which transmit to the condenser lens and are focused by the condenser lens into a plurality of projecting beams; wherein the solid state lighting array comprises five of the solid state lighting elements, the five solid state lighting elements are arranged in a cross shape, one of the solid state lighting elements is located in a center of the cross shape, and the other four solid state lighting elements surround the solid state lighting element located in the center of the cross shape.

7. The light source structure of claim 6, wherein the optical collimator lens array is positioned in front the solid state lighting array.

8. The light source structure of claim 7, wherein each optical collimator lens is positioned correspondingly to each solid state lighting element.

9. The light source structure of claim 7, wherein the optical collimator lens array is a cross array.

10. The light source structure of claim 9, wherein the condenser lens is positioned in front of the optical collimator lens array.

11. The light source structure of claim 10, wherein each optical collimator lens comprises a first incident surface facing the corresponding solid state lighting element and a first exiting surface opposite to the first incident surface.

12. The light source structure of claim 11, wherein the condenser lens comprises a second incident surface facing the first exiting surfaces of the corresponding optical collimator lenses.

13. The light source structure of claim 6, wherein the solid state lighting elements are electrically connected.

14. The light source structure of claim 6, wherein each solid state light element comprises a light emitting diode.

15. The light source structure of claim 6, wherein each solid state light element comprises a laser diode.

* * * * *